US009681333B2

(12) United States Patent
Xhafa et al.

(10) Patent No.: US 9,681,333 B2
(45) **Date of Patent: *Jun. 13, 2017**

(54) ENHANCING PACKET AGGREGATION PERFORMANCE IN COEXISTING WIRELESS NETWORKS

(71) Applicant: Texas Instruments Incorporated, Dallas, TX (US)

(72) Inventors: Ariton E. Xhafa, Plano, TX (US); Yanjun Sun, Richardson, TX (US); Ramanuja Vedantham, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/860,154

(22) Filed: Sep. 21, 2015

(65) Prior Publication Data

US 2016/0014638 A1 Jan. 14, 2016

Related U.S. Application Data

(60) Continuation of application No. 14/301,656, filed on Jun. 11, 2014, now Pat. No. 9,143,983, which is a division of application No. 13/161,057, filed on Jun. 15, 2011, now Pat. No. 8,879,580.

(60) Provisional application No. 61/355,584, filed on Jun. 17, 2010.

(51) Int. Cl.

| | |
|---|---|
| ***H04J 3/24*** | (2006.01) |
| ***H04L 12/43*** | (2006.01) |
| ***H04W 28/06*** | (2009.01) |
| ***H04L 1/18*** | (2006.01) |
| ***H04W 84/12*** | (2009.01) |
| ***H04W 88/06*** | (2009.01) |
| *H04W 28/04* | (2009.01) |
| *H04W 84/18* | (2009.01) |

(52) U.S. Cl.
CPC ......... *H04W 28/065* (2013.01); *H04L 1/1854* (2013.01); *H04W 84/12* (2013.01); *H04W 88/06* (2013.01); *H04W 28/04* (2013.01); *H04W 84/18* (2013.01)

(58) Field of Classification Search
CPC .............. H04W 16/14; H04W 28/065; H04W 72/1215; H04W 88/06; H04W 84/18; H04W 28/04
USPC ......................... 370/328, 338, 473, 458, 459
See application file for complete search history.

(56) References Cited

U.S. PATENT DOCUMENTS

| | | | | |
|---|---|---|---|---|
| 9,258,833 | B2 * | 2/2016 | Bitran | H04W 16/14 |
| 2004/0100918 | A1 * | 5/2004 | Toskala | H04W 36/18 370/314 |
| 2005/0152358 | A1 * | 7/2005 | Giesberts | H04L 29/06 370/389 |
| 2006/0140172 | A1 * | 6/2006 | Trainin | H04W 99/00 370/352 |
| 2011/0243046 | A1 * | 10/2011 | Huang | H04W 72/1215 370/311 |
| 2013/0272260 | A1 * | 10/2013 | Bitran | H04W 16/14 370/329 |

* cited by examiner

*Primary Examiner* — Hoang-Chuong Vu
(74) *Attorney, Agent, or Firm* — Ronald O. Neerings; Charles A. Brill; Frank D. Cimino

(57) ABSTRACT

A wireless combination device is coupled to an antenna for communicating via a first wireless network. A second wireless transceiver configured for communication via said second wireless network. A packet aggregator is coupled to the first wireless transceiver configures a frame aggregated packet for at least a portion of activities on the first wireless network. The frame aggregated packet includes a plurality of data packets and a dummy packet or spoofing so that said frame aggregated packet is extended in time or indicates an extension sufficient to overlap a Tx time interval or Rx time interval for communications occurring over a second wireless network. The first wireless network and said second wireless network are overlapping networks.

17 Claims, 6 Drawing Sheets

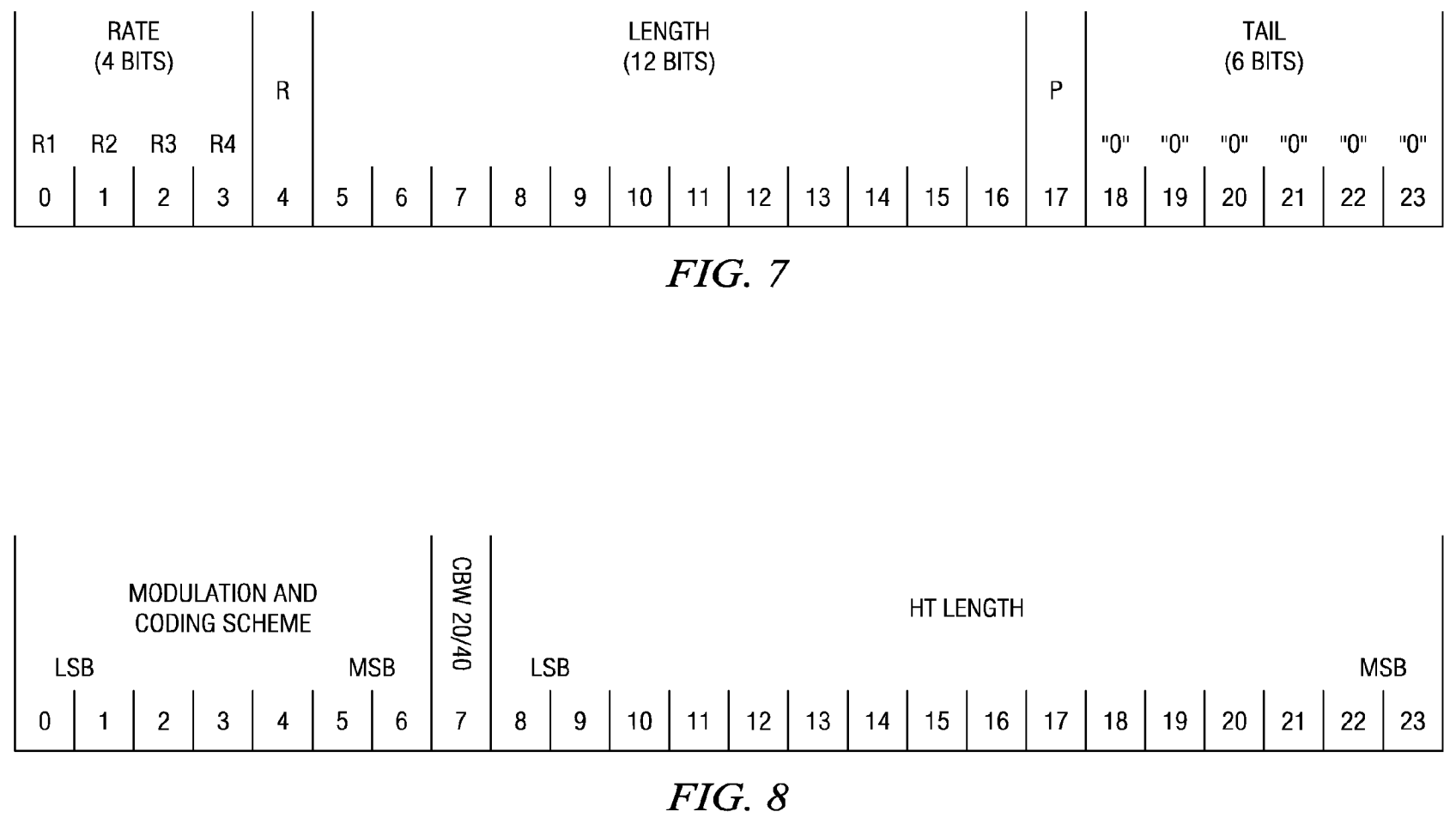

| RATE (4 BITS) | | | | R | LENGTH (12 BITS) | | | | | | | | | | | | P | TAIL (6 BITS) | | | | | |
|---|---|---|---|---|---|---|---|---|---|---|---|---|---|---|---|---|---|---|---|---|---|---|---|
| R1 | R2 | R3 | R4 | | | | | | | | | | | | | | | "0" | "0" | "0" | "0" | "0" | "0" |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

*FIG. 7*

| MODULATION AND CODING SCHEME | | | | | | | CBW 20/40 | HT LENGTH | | | | | | | | | | | | | | | |
|---|---|---|---|---|---|---|---|---|---|---|---|---|---|---|---|---|---|---|---|---|---|---|---|
| LSB | | | | | | MSB | | LSB | | | | | | | | | | | | | | | MSB |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

*FIG. 8*

ENHANCING PACKET AGGREGATION PERFORMANCE IN COEXISTING WIRELESS NETWORKS

CROSS REFERENCE TO RELATED APPLICATIONS

This application is a Continuation of and claims priority to U.S. patent application Ser. No. 14/301,656, filed Jun. 11, 2014, which is a Divisional of and claims priority to U.S. patent application Ser. No. 13/161,057, filed Jun. 15, 2011, which claims the benefit of Provisional Application Ser. No. 61/355,584 entitled "MECHANISM TO ENHANCE PACKET AGGREGATION PERFORMANCE IN COEXISTING WIRELESS NETWORKS", filed Jun. 17, 2010. Said applications herein incorporated by reference in its entirety.

FIELD

Disclosed embodiments are directed, in general, to wireless communication systems and, more specifically, methods of operating in wireless networks having coexisting overlapping bands.

BACKGROUND

As wireless technologies proliferate, mobile wireless devices incorporate a multiplicity of different wireless standards. For example, a cellular telephone can accommodate a cellular network (e.g., Universal Mobile Telecommunications System), a wireless local area network ("WLAN"), such as IEEE 802.11, and a wireless personal area network ("WPAN") such as Bluetooth (BT). Including WPAN access makes utilization of a wireless device more convenient by allowing use of wireless headsets and other short-range wireless appliances.

Some wireless networks occupy an adjacent or overlapping frequency spectrum. For example, BT and IEEE 802.11b/g/n, and WiMax can utilize the same 2.4-2.5 GHz band. Mobile wireless devices are sometimes capable of accessing multiple wireless networks, such as a cellular smart phone that supports radios in overlapping RF bands (a combination device that is referred to herein as a "combo device").

Therefore, interference between these technologies operating in the same device creates challenges on the coexistence of these two wireless interfaces. More specifically, the out of band emission by either technology may saturate the receiver of the other technology and hence, blocking may occur. The limited medium time available to each radio is more problematic.

To solve the network coexistence problem in which WLAN is one of the subsystems operating in the same combo device, time multiplexed operation is used. For example, in the case of WLAN and BT coexistence, BT voice calls can take priority over other traffic flows in WLAN. During the time periods that the combo device operates in BT mode, the WLAN can operate in unscheduled automatic power saving delivery (U-APSD) mode. During the time that the combo device operates in WLAN mode, it sends a trigger frame (or a PS-Poll if legacy power save mode is used) to the access point (AP) indicating that it is ready to receive packets.

Regarding legacy PS mode, usually, the node/station (node/STA) tries to send the PS-Poll frames immediately after the BT active gap is over, therefore increasing the chances that the AP will send a data frame during the BT idle gap. However, depending on how congested the network is, the AP may not be able to send the data frame during the BT active gap. Hence, the node/STA sends the clear to send (CTS2Self) frame to protect from the avalanche effect. However, as described below, for long aggregated packets such as aggregated medium access control (MAC) protocol data unit (A-MPDU) packets, CTS2Self may become unreliable.

IEEE 802.11n technology can further complicate coexistence of WLAN and BT technology on combo devices. IEEE 802.11n allows multiple medium access control (MAC) data frames to be carried in a single physical frame (referred to as aggregation or an aggregate). There are two forms of frame aggregation: Aggregated MAC Protocol Data Unit (A-MPDU) and Aggregated MAC Service Data Unit (A-MSDU). These aggregated packets comprising a plurality of data frames have a larger size and occupy (for the most part) a longer duration of time as compared to a single packet transmitted using IEEE 802.11g technology. Performance of IEEE 802.11n with BT voice can degrade substantially, and can result in the combo device being disconnected from the AP.

For example FIG. 1A depicts a known wireless network 100 including an AP for a first network shown as a WLAN AP 110 (hereafter AP), and a combo device 120 identified as a STA1-BT master at a combo node. Combo device 120 communicates over a second network that overlaps the first network shown as BT to a BT slave 125 (e.g., an earpiece), and combo device 120 communicates over WLAN to AP 110. Network 100 also includes several WLAN STAs shown as STA2 (122) and STA3 (123).

FIG. 1B is a timing diagram that depicts activity of the combo device 120 shown as STA1, and AP 110, including the mode that is active as a function of time, showing overlapping of A-MPDU packet transmission from AP 110 intended for receipt by combo device 120 into a BT active interval for combo device 120. A-MPDU packets comprise a plurality of medium access control layer (MAC) frames. Overlap can occur because the transmission of a long A-MPDU by the AP 110 started before a CTS2Self frame is transmitted by the combo device 120, or because the combo device 120 may want to transmit an A-MPDU packet in the uplink (e.g., to AP (110)). SIFS shown stands for short interframe spacing.

Since the transmission of a block acknowledgement (BA) response expected from the combo device to the A-MPDU packet falls within the BT activity interval of the combo device 120, a BA response cannot be transmitted by the combo device 120. The AP 110 will thus not receive an acknowledgement from the combo device 120 and will therefore assume that the A-MPDU packet that was transmitted to the combo device 120 was not received (lost). AP 110 will try to retransmit the same A-MPDU packet at a later time to combo device 110 which reduces the transmission rate and in some instances can result in dropped data.

SUMMARY

Disclosed embodiments include aggregated packet designs for wireless communications that feature enhanced packet aggregation for improving performance in coexisting wireless networks that comprise (i) a combination (combo) device that communicates over both first and second wireless networks and at least (ii) a first wireless device that communicates over a first wireless network. The first wireless device can act as an AP for the first wireless network, or simply be another STA (e.g., for a peer to peer connection arrangement).

Disclosed packet aggregators generate frame aggregated packets for transmission over the first network that include a plurality of data packets and a dummy packet or spoofing so that the frame aggregated packet is extended in time or indicates an extension sufficient to overlap a Tx time interval or Rx time interval for the second network. The combo device transmits or receives an acknowledgement (ACK) on the first network during the activity interval for the second wireless network.

In one embodiment the first wireless device can include a disclosed packet aggregator. In this embodiment, the duration of transmitted aggregated packets from the first wireless device allows the combo device to send the ACK over the first network during the second network activity interval, typically during a non-operation time (referred to herein as a remaining time) for the second wireless network. In another embodiment the combo device includes a disclosed packet aggregator. In this embodiment the combo device receives an ACK over the first wireless network during the activity interval for the second wireless network.

The extended length for disclosed aggregated packets such as an A-MPDU frame helps ensure successful reception of an immediate block ACK (BA) frame, to improve first network performance without sacrificing second network performance. Disclosed packets can also improve performance without use of CTS2Self frames for protection, since the duration of an aggregated packet can protect the second network (e.g., BT) interval and not let avalanche occur. In certain embodiments both the first wireless device and combo device can include a disclosed packet aggregator.

BRIEF DESCRIPTION OF THE DRAWINGS

FIG. 1A depicts a known wireless network including a first network AP shown as a WLAN AP, and a combo device that communicates with AP of the first network and over a second overlapping network shown as BT to a BT slave, while

FIGS. 7 and 8 depict examples of fields in the PHY preamble of the aggregated IEEE 802.11n packet that can be modified to account for disclosed extended packet length duration, according to example embodiments.

DETAILED DESCRIPTION

Figure 1A:
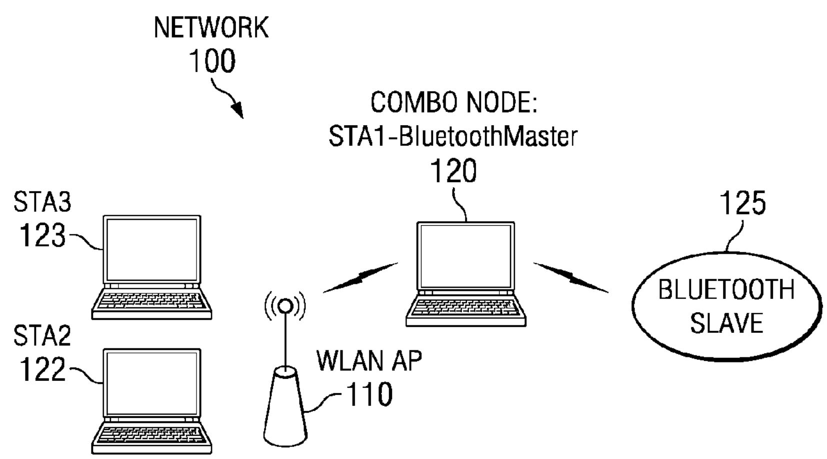
Figure 1B:
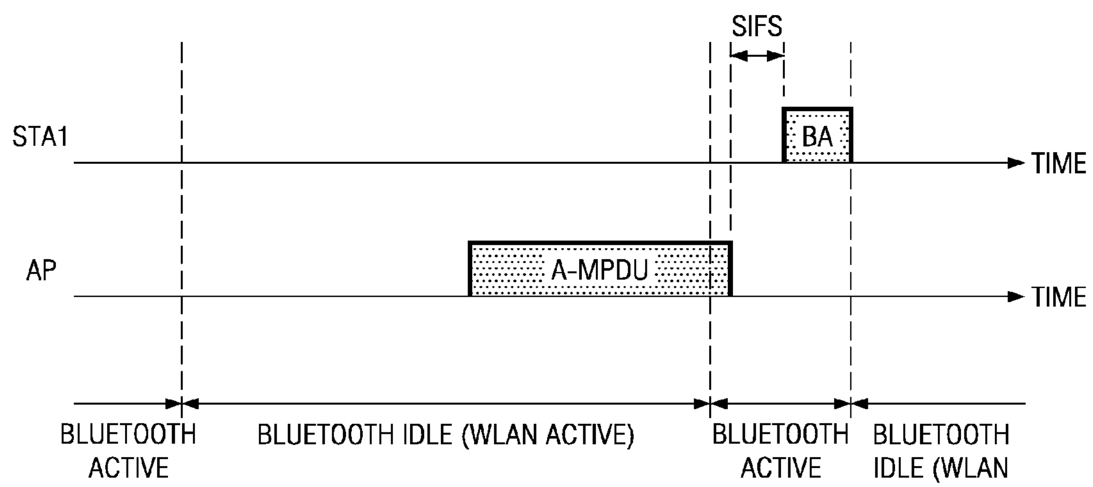
FIG. 1B depicts overlapping of an A-MPDU packet transmission from the AP and the BT active interval of the combo device.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Disclosed embodiments include aggregated packet designs for wireless communications that improve performance of coexisting wireless networks that include at least one combo device. For example, when the first network comprises a WLAN and the second network comprises BT, and aggregated packets such as A-MPDU or A-MSDU packets are used for the WLAN communications, the duration of such conventional aggregated packets can overlap with BT operation for the combo device that can cause efficiency loss and packet drops for first network communications. Disclosed embodiments include having the wireless device(s) that transmits the aggregated packets over the first network extend the length of the first network packet communications by including a dummy packet or spoofing so that frame aggregated packet is extended or indicates an extension sufficient to overlap the Tx time interval or Rx time interval on the second wireless network. Disclosed packet aggregation helps ensure successful transmission and/or reception of an ACK frame by the combo device, and can improve first network throughput without sacrificing second network performance.

The paragraph below clarifies spoofing, adding gaps and dummy packets as used herein for extending the length of packet communications, with reference to an example A-MPDU packet. An aggregated MPDU packet has two PHY preambles, one legacy and the other high throughput (HT) preamble. The legacy portion always indicate a data length and a data rate such that the time duration of the packet=data_length/data_rate. In some arrangements, even though the aggregated packet might be shorter (in time), the legacy portion may indicate a longer packet in time; hence spoofing. If one or more dummy packets are added, then the legacy portion of the preamble performs the same function: packet_in_time=data_length/data_rate. However, if gaps are added; the real packet duration is smaller than data_length/data_rate, hence, spoofing. However, spoofing in this case can also be done at the HT preamble portion. So both, legacy and HT preambles are indicating a data length such that it covers the gaps that needs to be introduced (it is noted that the data rate and data length in legacy and HT preamble need not be the same).

Figure 2A:
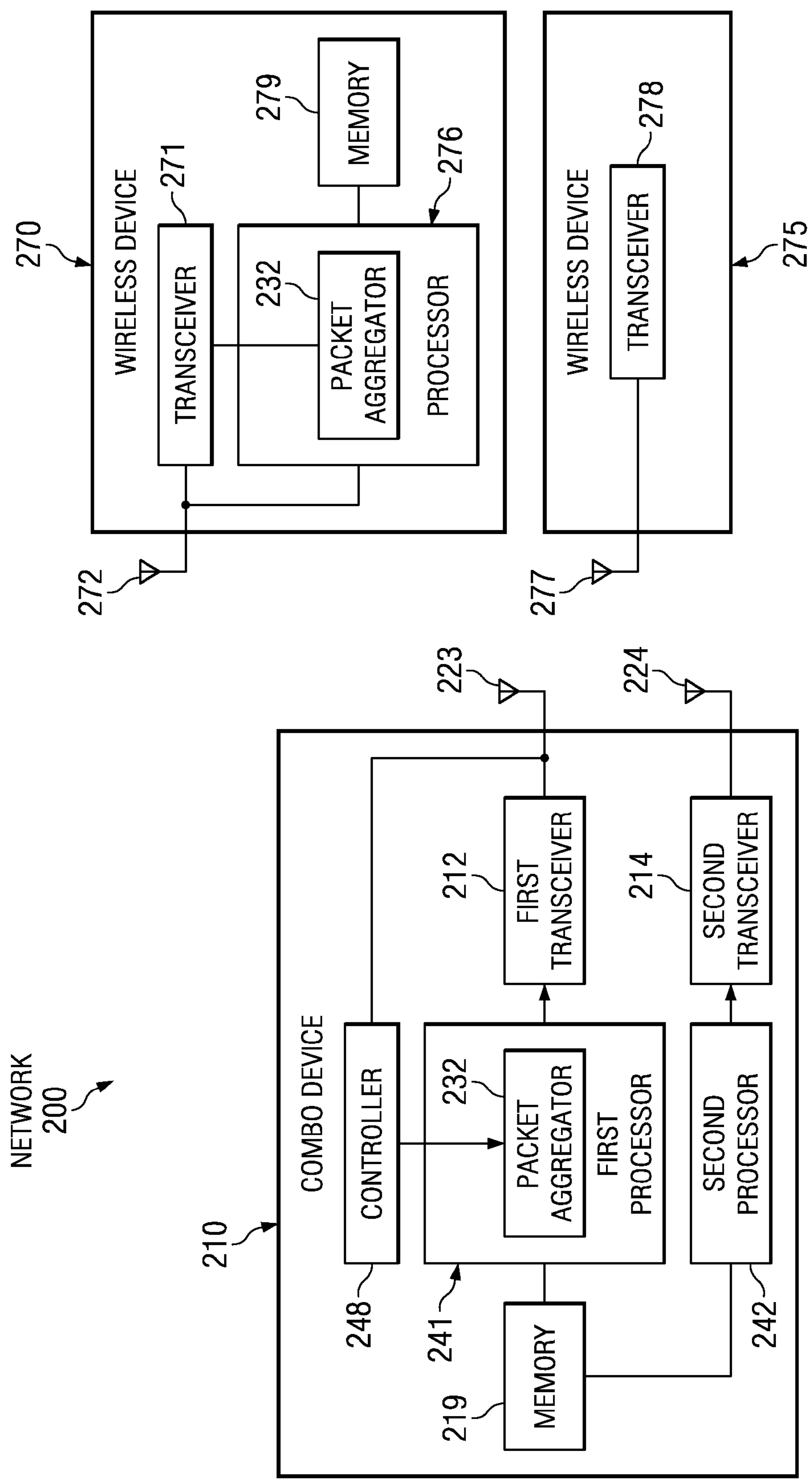
FIG. 2A is a block diagram depiction of an example coexisting wireless network according to an example embodiment, including a wireless combo device including a disclosed packet aggregator and a first wireless device communicating via the first wireless network, and another wireless device communicating via the second wireless network, where the combo device has separate antennas for the respective network communications.

FIG. 2A is a block diagram depiction of an example coexisting wireless network 200 according to an example embodiment. Network 200 includes a wireless combination (combo) device 210 including a first wireless transceiver 212 communicating via a first wireless network and a second wireless transceiver 214 communicating via a second wireless network that overlaps the first wireless network. Transceiver 212 is coupled to antenna 223, and transceiver 214 is coupled to antenna 224. In another embodiment described below relative to FIG. 2B, the respective transceivers 212, 214 share a common antenna.

Combo device 210 includes a first processor 241 (e.g., a digital signal processor) that is coupled to the first transceiver 212, and a second processor 242 coupled to the second transceiver 214. First processor 241 implements a packet aggregator 232 function using a disclosed packet aggregator algorithm stored in memory 219 based on timing control information provided by controller 248, which in one embodiment is a central processing unit (CPU). Although controller 248 is shown located at the combo device 210, the controller can generally be located anywhere in the network 200, as long as its information can be received and interpreted correctly by the devices in the network 200. Controller 248 conveys timing information to the devices in each network, and is shown in FIG. 2 coupled to first processor 241 of combo device 210 to provide timing control information generally by a wired connection for combo device 210, and is coupled to antenna 223 for transmitting timing information over the first network to wireless device 270.

Wireless device 270 communicates via the first wireless network and is configured as an AP for network 200. However, as noted above, wireless device 270 can simply be another STA in the first network (e.g., for a peer to peer connection arrangement). Wireless device 270 comprises a transceiver 271, an antenna 272 and processor 276. Processor 276 implements a packet aggregator 232 function using a disclosed packet aggregator algorithm stored in memory 219 based on timing information provided by controller 248 received via antenna 272. A second first wireless device 275 that includes transceiver 278 communicates via the second wireless network and includes antenna 277.

Figure 2B:
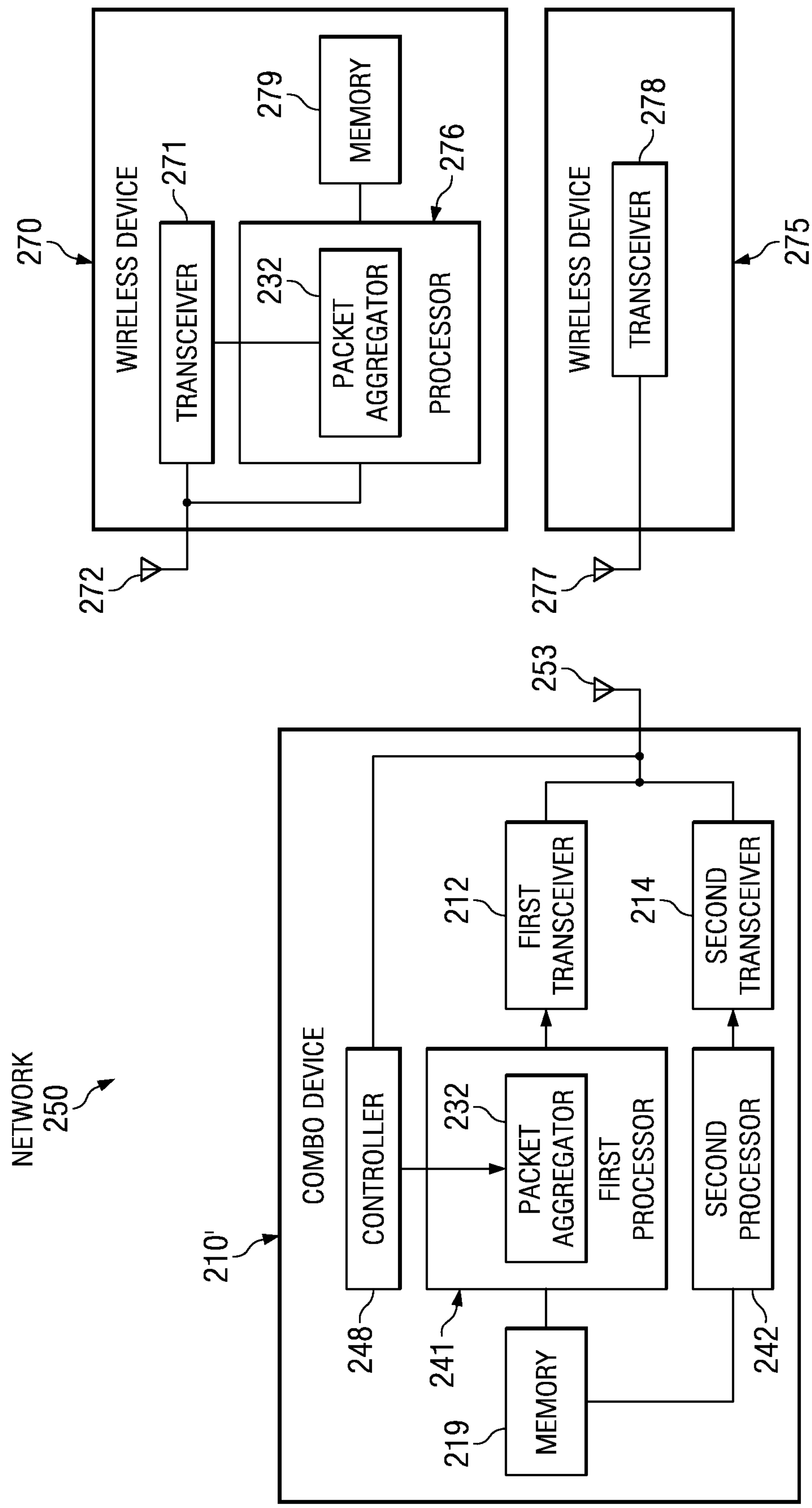
FIG. 2B is a block diagram depiction of an example coexisting wireless network according to an example embodiment including a wireless combo device including a disclosed packet aggregator and a first wireless device communicating via the first wireless network, and another wireless device communicating via the second wireless network, where the combo device has a single antenna for the respective network communications.

FIG. 2B is a block diagram depiction of an example coexisting wireless network 250 according to an example embodiment, including the wireless combo device shown in FIG. 2A modified to have a single antenna 253 for the respective network communications shown as combo device 210', along with the first wireless device 270, and other wireless device 275 shown in FIG. 2A. Having a single antenna, time multiplexing is generally used and combo device 210' cannot generally simultaneously transmit/receive in both networks.

In one particular embodiment the first wireless network comprises a WLAN and the second wireless network comprises a WPAN. Example WPANs include BT, as well as Zigbee and LTE which use the ISM band.

Figure 3:
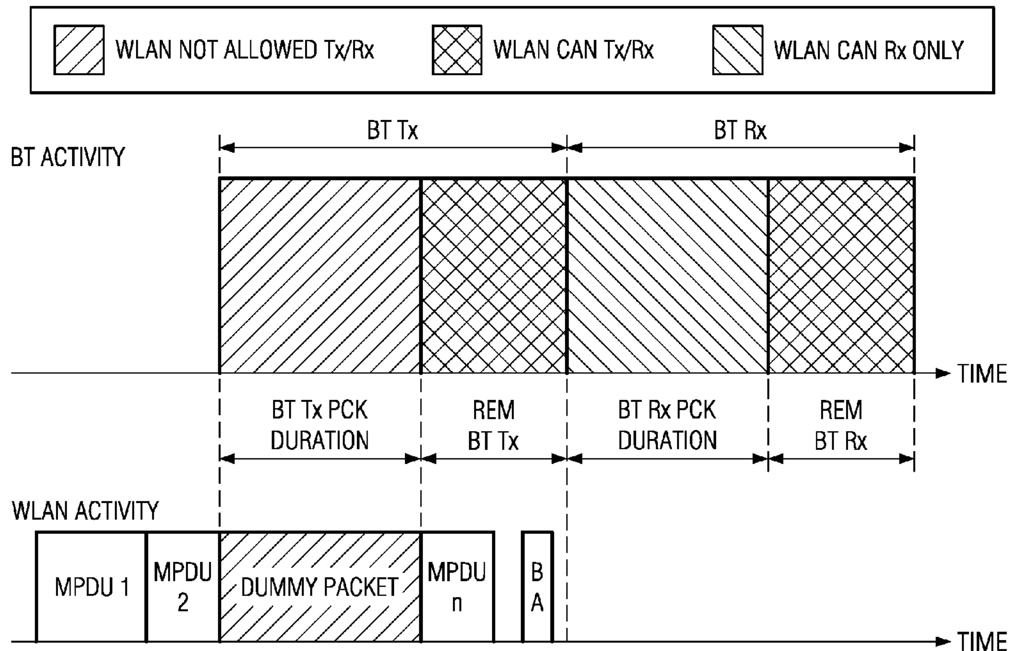
FIG. 3 is an example timing diagram showing WLAN and BT activity where a WLAN AP transmits an A-MPDU packet including a dummy packet portion to a combo device, according to an example embodiment.

FIGS. 3-6 described below are for the particular coexisting network arrangement comprising WLAN and BT, with the understanding that disclosed embodiments are in no way limited to this particular coexisting network arrangement. FIG. 3 is an example timing diagram showing WLAN and BT network activity where a WLAN AP transmits an A-MPDU packet including a dummy packet portion to a combo device, according to an example embodiment.

The BT active interval is seen to be split into the BT transmit (BT Tx) and BT receive (BT Rx) intervals. Depending on which device is the master or the slave for BT, the Rx interval can be before Tx interval. As shown in FIG. 3, for the BT Tx interval, the duration of the BT packet does not always occupy the full BT Tx interval. Hence, the unused/remaining (Rem) time in the BT Tx interval can be used by the combo device in disclosed embodiments to Rx or Tx packets over the WLAN network. Thus, if the combo device is receiving an aggregated packet (e.g., A-MPDU packet), it can reply with a BA response provided that its response does not overlap with its BT Rx time. The portion of the A-MPDU packet at the time the combo device is transmitting the BT packet as shown in FIG. 3 is a dummy packet (e.g., data with stuffed bits) that as shown in FIG. 3 completely fills the TX packet duration.

The dummy packet need not have any particular content, and can be empty (no packet). The dummy packet is described as follows for A-MPDU packets when not empty:
(i) If the length to be covered by the dummy packet is longer than what maximum_size_per_mpdu_packet/data_rate indicates, then the dummy packet can be a combination of packets such that the total duration is the same as the duration needed to be covered. In that scenario, the packet delimiter which gives the packet length should generally be present for each of these packets.
ii) If the length to be covered by the dummy packet is shorter than what maximum_size_per_mpdu_packet/data_rate indicates, then, there will generally be a single packet where the packet delimiter indicates the packet length.
iii) The content of the packet (or packets) comprising the dummy packet can be all zeros or all ones. In that case, the packet decoding can be skipped.

It is noted that the packet/data_rate is given in the PHY preamble header carrying the aggregated frame. Each frame/packet is generally separated by a packet delimiter which also has a length information of the following packet.

The duration of the dummy packet shown in FIG. 3 can be utilized by the AP as it sees fit. For example, the AP can start transmissions during the dummy packet interval to other STAs in the network. Note that after receiving the BA response from the combo device the AP can also continue with transmission of other frames/packets to the combo device. This is possible if both first and second transceivers for WLAN and BT, respectively, each have their own antenna. The first and second transceivers for WLAN and BT, respectively, can also use a single antenna. The device may need to switch to WLAN to transmit BA to the AP; then, go to BT mode again just before BT Rx starts. During this time, the AP can still transmit a packet to the device, provided that the reply comes during allowed WLAN Tx time.

Figure 4:
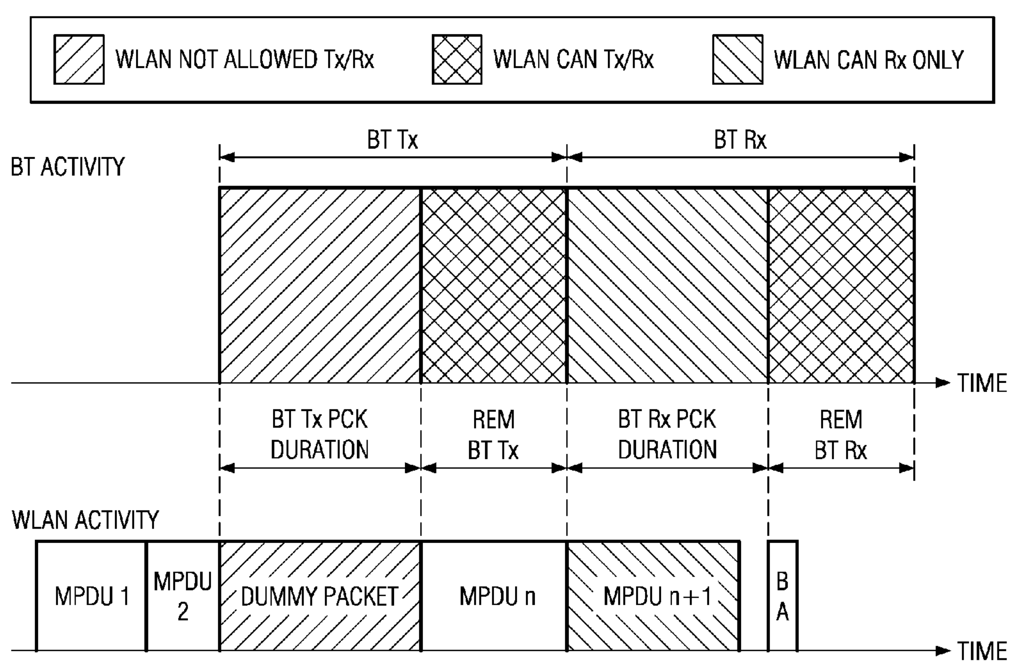
FIG. 4 shows an example timing diagram for another arrangement where a WLAN AP transmits an A-MPDU packet including a dummy packet portion to a combo device, according to an example embodiment.

FIG. 4 shows an example timing diagram for another arrangement where a WLAN AP transmits an A-MPDU packet including a dummy packet portion to a combo device, according to an example embodiment. Note that in FIG. 4, the A-MPDU transmitted by the AP can last up to the near end of the BT Rx packet duration, if both WLAN and BT on the combo device each have separate antennas. If both WLAN and BT on the combo device share the same antenna, then the last MPDUn+1 can be a dummy packet. A dummy packet can be transmitted if the length of MPDUn is almost the same as that of remaining BT Tx time and a BA cannot be sent by the combo device without overlapping with BT Rx time interval. Also note that in FIG. 3, the AP may choose not to transmit MPDUn and can simply transmit a dummy packet as shown, or set the duration field of the packets to account for the dummy packet length (see the below described combo device behavior for transmitting A-MPDU packets. In some other scenarios, where Tx/Tx operation is allowed for dual antenna combo device operation, then the combo device can also transmit a BA frame during the BT Tx pck duration interval.

If the duration of the transmitted BT packet by the combo device fully occupies BT Tx interval, then A-MPDU packets transmitted from the AP can last up to the time to ensure that a BA response can be sent by the combo device. In this case, the duration will be up to the end of received BT packet less the SIFS. Thus, the length of the dummy packet in FIG. 4 can be extended to cover the full BT Tx interval and a conventional MPDU packet can be appended to the A-MPDU and received during BT Rx interval with either the WLAN and BT transceivers having separate antennas or a shared LNA for single shared antenna embodiments, or the length of the dummy packet can extend to cover BT Tx and BT Rx pck duration interval less the SIFS. If both BT Tx and BT Rx intervals are fully occupied, then the dummy packet (or spoofing portion) of the A-MPDU packet duration) can be extended until the last of BT active interval less the SIFS.

As noted above, the combo device can include a disclosed packet aggregator. For the combo device transmitting an aggregated packet such as an A-MPDU for which a BA response from the AP may fall within the combo device's BT activity interval, the combo device can spoof to extend the length of the aggregated packet so that the BA is sent by the AP in an unused (Rem) BT Tx interval, or it is received during the BT Rx interval if the unused (Rem) BT Tx interval is zero.

Spoofing of the length of the aggregated packet as disclosed herein can be done in the physical (PHY) layer preamble (PLPC) of the packet. The two fields that can define packet duration are one for the legacy devices (IEEE 802.11 b,a,g) and the other one is for high throughput (HT) stations (or IEEE 802.11n capable devices). Both of these fields are generally configured to indicate the same packet duration. While the legacy portion that indicates the duration can spoof the time and the data rate, the HT portion generally should provide the correct data rate used. Hence, for A-MPDU packet embodiments, a wireless STA such as a combo device can choose to spoof the length of the A-MPDU packet and start resuming A-MPDU transmission once allowed, or spoof the length of the packet until the time interval that a BA response can be received from the AP without resuming A-MPDU transmission even if allowed.

Figure 5:
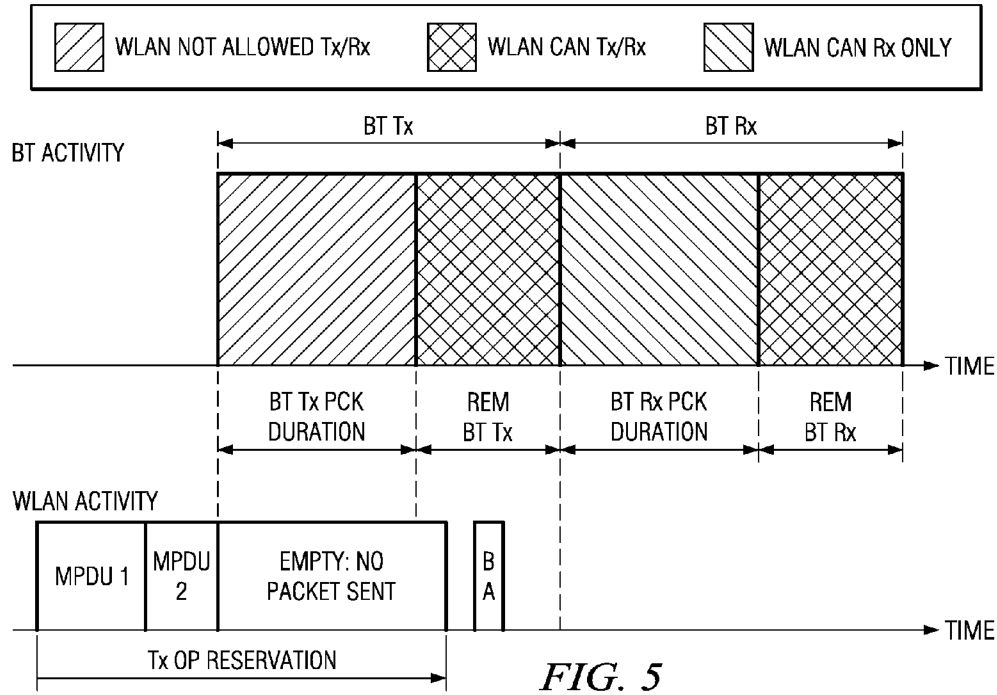
FIG. 5 shows an example timing diagram for a wireless STA transmitting over a WLAN network including a dummy packet portion shown as an empty packet that spoofs the duration of the end of the A-MPDU packet to extend to the remaining (Rem) time in the BT Tx interval of a combo device, according to an example embodiment.
Figure 6:
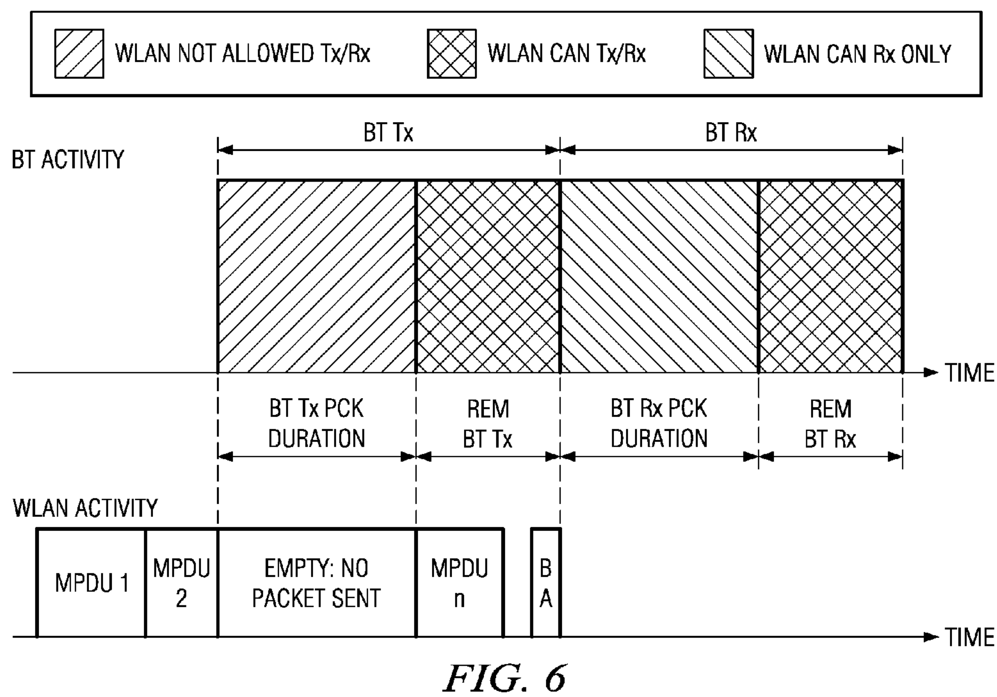
FIG. 6 shows an example timing diagram for a wireless STA transmitting over a WLAN network a dummy packet portion shown as an empty packet that spoofs the duration of the end of the A-MPDU packet to extend to the end of the BT Tx packet (pck) duration, followed by transmission of an additional MPDU packet that arrives during a remaining (Rem) time in the BT Tx interval of a combo device, according to an example embodiment.

It is noted that spoofing, as described above, can be used by the AP for aggregated packets as well. FIG. 5 shows an example timing diagram for a wireless STA transmitting over a WLAN network a dummy packet portion shown as an empty packet portion that spoofs the duration of the end of the A-MPDU packet to extend the remaining (Rem) time in the BT Tx interval of a combo device, according to an example embodiment. FIG. 6 shows an example timing diagram for a wireless STA transmitting over a WLAN network a dummy packet portion shown as an empty packet portion that spoofs the duration of the end of the A-MPDU packet to extend to the end of the BT Tx pck duration followed by transmission of an additional MPDU packet that arrives during a remaining (Rem) time in the BT Tx interval of a combo device, according to an example embodiment. For the shared antenna case, the empty spoofed time interval (where no packet is sent) can be implemented. However, if WLAN and BT have their own antenna, a dummy packet could alternatively be transmitted instead of the spoofed time interval. It is noted that if Tx/Tx operation is allowed, then the spoofed time duration where no packet is sent could be used to transmit a regular MPDU that is part of the A-MPDU.

FIGS. 7 and 8 depict examples of fields in the PHY preamble of the aggregated IEEE 802.11n packet that can be modified to account for disclosed extended packet length duration, according to example embodiments. In the L-SIG and HT-SIG1 fields shown in FIGS. 7 and 8, respectively, only the rate and the length of the packet is configured to show the end of the transmitted frame (or spoofed frame). While L-SIG is generally uses a different rate than what the A-MPDU packet is using, in the HT-SIG1 field the rate can be the one used, however, the length of the packet will be different. Hence, the following relationship can be used to determine packet length:

Length_data_*L*-SIG/rate_*L*-SIG=Length_data_HT-SIG1/rate_HT-SIG1(BW_Factor)

where BW_Factor relates to the rate found in the HT-SIG1 to the appropriate data rate based on the bandwidth being used.

Many modifications and other embodiments of the invention will come to mind to one skilled in the art to which this invention pertains having the benefit of the teachings presented in the foregoing descriptions, and the associated drawings. Therefore, it is to be understood that embodiments of the invention is not to be limited to the specific embodiments disclosed. Although specific terms are employed herein, they are used in a generic and descriptive sense only and not for purposes of limitation.

Many modifications and other embodiments of the invention will come to mind to one skilled in the art to which this invention pertains having the benefit of the teachings presented in the foregoing descriptions, and the associated drawings. Therefore, it is to be understood that the scope of the invention is not to be limited to the specific embodiments disclosed. Although specific terms are employed herein, they are used in a generic and descriptive sense only and not for purposes of limitation.

We claim:

1. A method of wireless communications, comprising:

transmitting a frame aggregated packet comprising a plurality of data packets and a dummy packet, so that said frame aggregated packet indicating an extension sufficient to overlap a Tx time interval or a Rx time interval;

receiving an acknowledgement (ACK) on a first network during an activity interval for a second wireless network, wherein during said activity interval for said second wireless network at least one of (i) said transmit (Tx) time interval is longer in duration than a Tx packet duration and (ii) said receive (Rx) time interval is longer in duration than a Rx packet duration to provide a remaining time and wherein said dummy packet completely filling said Tx packet duration or said Rx packet duration.

2. The method of claim 1, wherein said ACK is communicated during a portion of said remaining time.

3. The method of claim 1, wherein transmitting a frame aggregated packet comprising a plurality of data packets and said dummy packet is spoofing.

4. The method of claim 3, further comprising performing Tx activities during a duration of said spoofing.

5. The method of claim 3, wherein at least one of said plurality of data packets follows said dummy packet.

6. The method of claim 5, further comprising transmitting a final one of said plurality of data packets during said Rx packet duration or said Tx packet duration.

7. The method of claim 3, wherein said spoofing completely fills said Tx packet duration or said Rx packet duration, and further comprising receiving said ACK during said remaining time.

8. The method of claim 3, wherein said spoofing completely fills said Tx packet duration or said Rx packet duration, and further comprising receiving said ACK during said Tx time interval.

9. The method of claim 3, wherein said spoofing completely fills said Tx packet duration or said Rx packet duration, and further comprising receiving said ACK during said Rx time interval.

10. The method of claim 3, further comprising transmitting a final one of said plurality of data packets after said spoofing and during said remaining time.

11. The method of claim 1, wherein said first wireless network is a wireless local area network (WLAN) and said second wireless network comprises a wireless personal area network (WPAN).

12. The method of claim 11, wherein said WPAN operates according to a Bluetooth (BT) network protocol.

13. A wireless combination device, comprising:

a first wireless transceiver coupled to an antenna configured for communication via a first wireless network;

a second wireless transceiver configured for communication via a second wireless network; and a packet aggregator coupled to said first wireless transceiver that configures frame aggregated packet for at least a portion of activities on said first wireless network, wherein said frame aggregated packet includes a plurality of data packets and a dummy packet or spoofing extending in time sufficient to overlap a Tx time interval or Rx time interval for communications occurring over said second wireless network) wherein said first wireless network and said second wireless network are overlapping networks.

14. The wireless combination device of claim 13, wherein said wireless combination device performs Tx or Rx activities on said second wireless network during a duration of said dummy packet or said spoofing.

15. The wireless combination device of claim 13, further comprising a controller that conveys timing information to devices on said first wireless network and to devices on said second wireless network.

16. The wireless combination device of claim 13, wherein said first wireless network is a wireless local area network (WLAN) and said second wireless network comprises a wireless personal area network (WPAN).

17. The wireless combination device of claim 16, wherein said WPAN comprises a Bluetooth (BT) network.

* * * * *